United States Patent [19]

Gerstmann et al.

[11] Patent Number: 4,501,253
[45] Date of Patent: Feb. 26, 1985

[54] ON-BOARD AUTOMOTIVE METHANE COMPRESSOR

[75] Inventors: Joseph Gerstmann, Framingham, Mass.; William M. Hauck, Glenshaw, Pa.; Robert Raymond, Watertown, Mass.; Paul F. Swenson, Jr., Shaker Heights, Ohio

[73] Assignee: Consolidated Natural Gas Service Company, Inc., Cleveland, Ohio

[21] Appl. No.: 449,483

[22] Filed: Dec. 13, 1982

[51] Int. Cl.³ .............................................. F02B 43/00
[52] U.S. Cl. ................................... 123/527; 123/571; 123/1 A; 62/7
[58] Field of Search .................. 123/1 A, 527, 276 E, 123/571; 62/7

[56] References Cited

U.S. PATENT DOCUMENTS 3,789,820  2/1974  Douglas et al. ..................... 123/1 A
4,130,098  12/1978  Linder et al. ....................... 123/571

FOREIGN PATENT DOCUMENTS 162226  12/1981  Japan ................................. 123/1 A Primary Examiner—E. Rollins Cross
Attorney, Agent, or Firm—Pearne, Gordon, Sessions, McCoy, Granger & Tilberry

[57] ABSTRACT

A gaseous fuel system for a vehicle including an on-board compressor for recharging an associated pressure storage tank. The compressor and tank are mounted on the vehicle as a structural unit whereby the tank shields the compressor and high pressure gas flow circuits therebetween and provides a heat exchanger surface for the compressor. A regulator in series with a supply line of low pressure gas prevents gas flow when the compressor does not operate to maintain a vacuum in an intervening dispensing line. An $O_2$ sensor disconnects the compressor motor when the percentage of $O_2$ exceeds a predetermined safe limit. A bypass circuit allows the tank to be filled from a high pressure supply without operation of the compressor.

11 Claims, 5 Drawing Figures

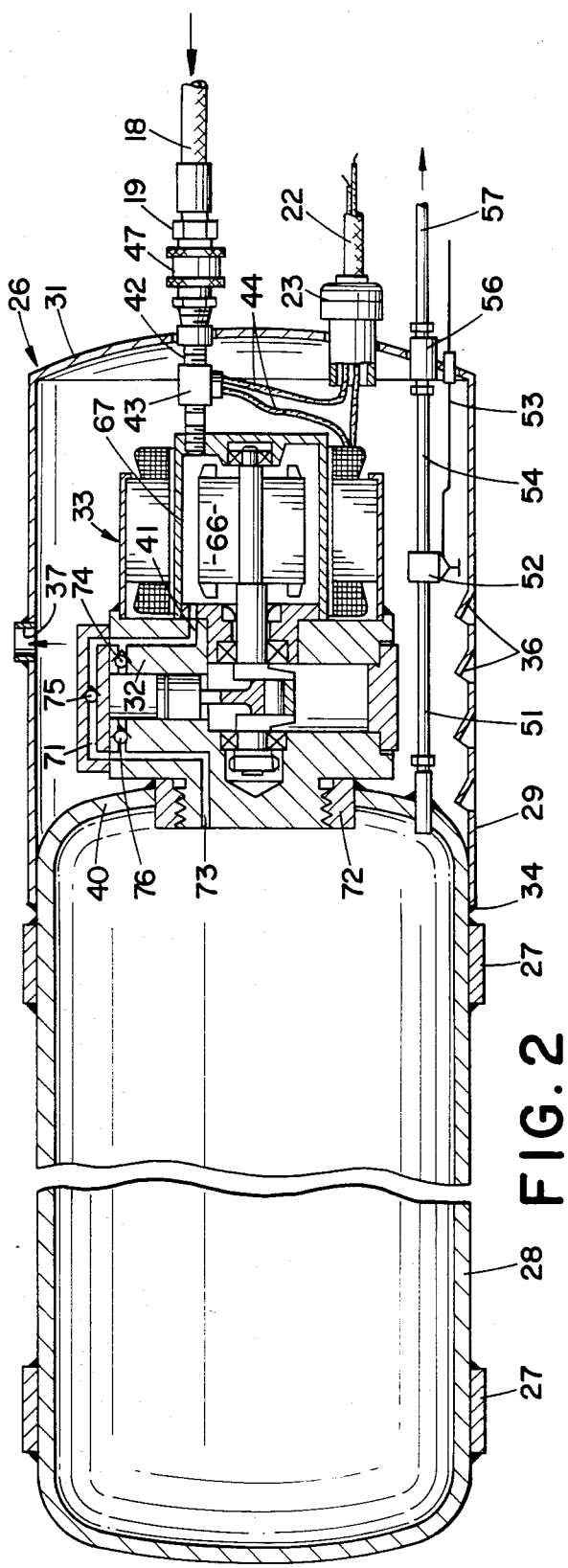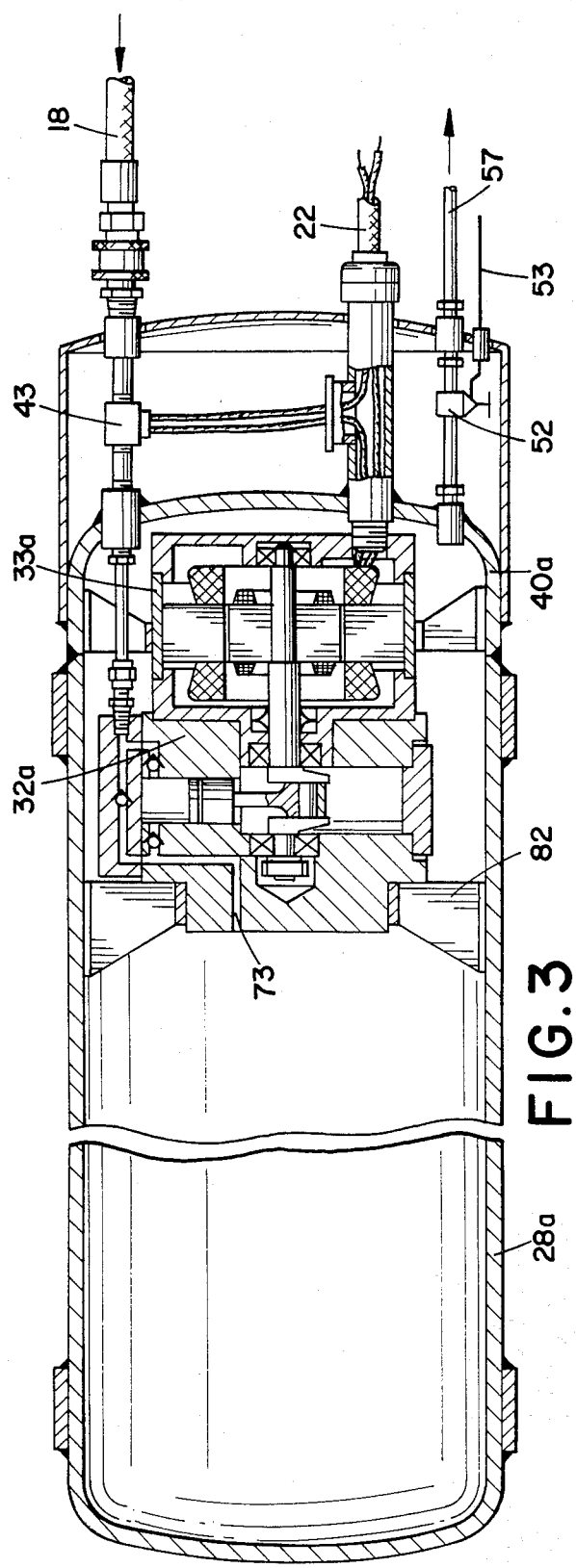

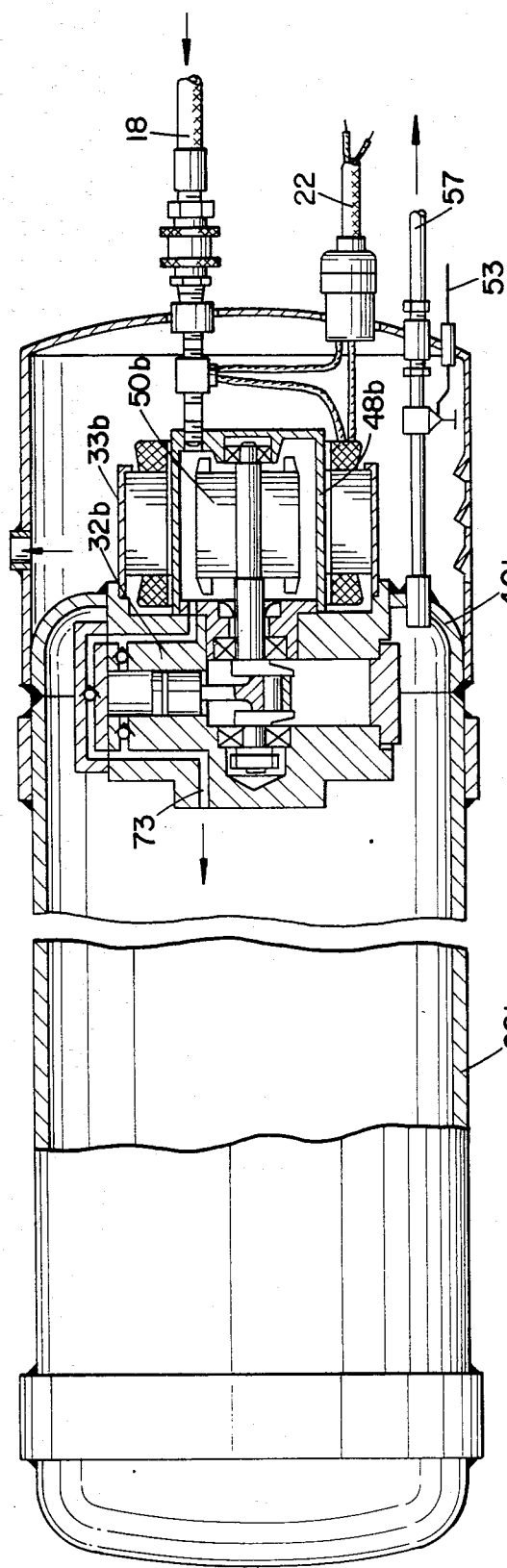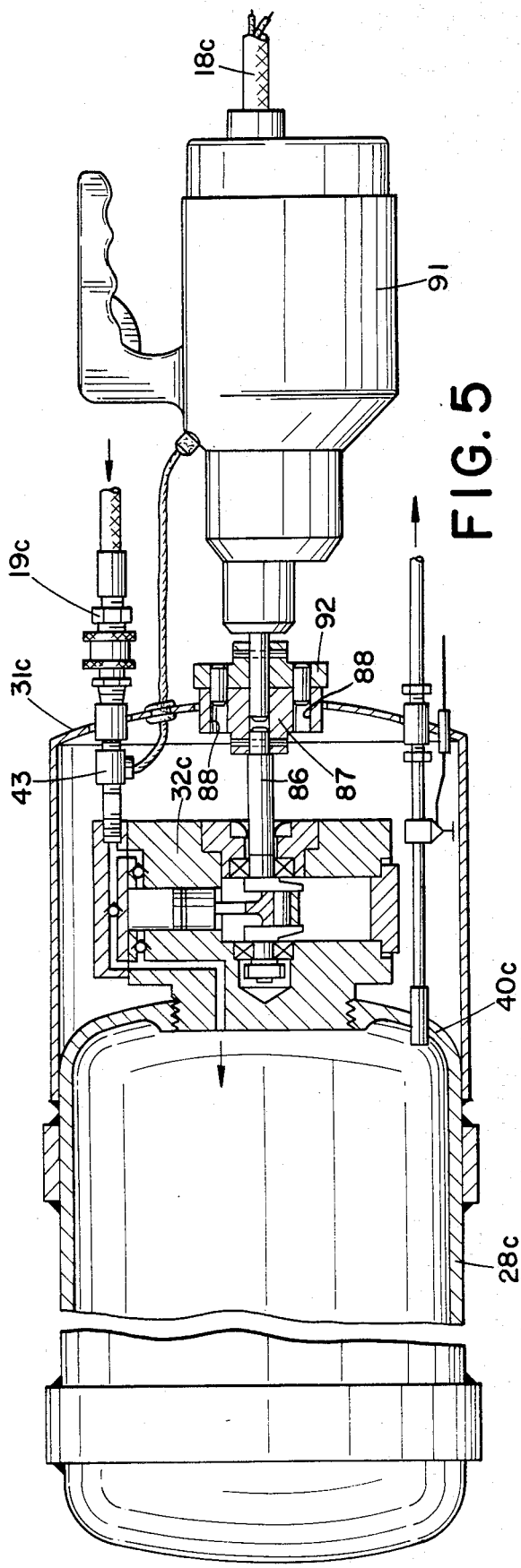

ON-BOARD AUTOMOTIVE METHANE COMPRESSOR

BACKGROUND OF THE INVENTION

The invention relates to combustion powered vehicles, and more particularly to gaseous fuel systems for such vehicles.

PRIOR ART

It is known to operate spark ignition internal combustion engines in automobiles and like vehicles on gaseous fuels such as methane, natural gas, and the like. Such gaseous fuels are potentially more economical than gasoline on a BTU basis and, when burned, produce relatively low levels of pollution. The gaseous fuel is highly compressed to a pressure of 2000 to 3000 psi, for example, to provide sufficient BTU content in a tank or tanks of a size practical to be carried on the vehicle without occupying excessive space. Typically, the tanks, which may be permanently or semipermanently installed on a vehicle, are refilled at a station having a compressor and high-pressure storage capacity to service a fleet of vehicles. Presently, however, service facilities of the type described are generally not available to the public at large.

Where a vehicle-mounted pressure tank is refilled from a high pressure source, the dispensing line must be repeatedly coupled and uncoupled. During each refill cycle, the coupling element must contain gas at high pressure without leakage. The high pressures and repeated coupling engagement cycles impose rigorous service conditions on a system.

More recently, smaller scale refilling stations have been proposed to serve only one or a few vehicles on a daily basis. Small capacity installations can take advantage of natural gas utility service lines already existing in a community. Small capacity filling units appear to be economically feasible when used to recharge a vehicle that is regularly out of service, e.g., after regular business hours. In these circumstances, the compressor can be of relatively small volumetric capacity, since it can be operated throughout the period that the vehicle is out of use. Prior known refilling stations for gaseous fuels in general are not entirely suited for the consumer home market. A major obstacle to their widespread adoption has been the necessity, as discussed previously in connection with high-capacity units, to routinely couple and uncouple high pressure lines without leakage.

SUMMARY OF THE INVENTION

The invention provides a gaseous fuel system for vehicles according to which each vehicle carries a dedicated compressor, associated compressed gas storage, and refill coupling equipment. The system, by locating the compressor on the vehicle, permits use of a low pressure line for refilling the vehicle gas storage. Such an arrangement eliminates the risk of a high pressure leak when coupling or uncoupling the fill line. Because of its relative safety and simplicity, the disclosed system is particularly adapted to be situated at a residence or small business location, thereby taking full advantage of existing natural gas service lines.

In addition to these safety and convenience benefits realized by the consumer, the disclosed compressor/tank unit provides further safety and economy features. The compressor, ideally, is structurally combined with the tank in such a manner that its delivery port communicates directly with the tank interior. Further, the arrangement of the compressor/tank unit ensures that heat generated by the compressor is largely dissipated by conduction to the walls of the tank.

Since high pressure conduits between the compressor and storage tank are avoided, potential leakage sites are also eliminated. Manufacturing costs are reduced where, as disclosed, the compressor is at least partially supported by the tank so that the tank functions as a heat exchanger to carry off heat from the compressor and the body of the tank shields the compressor from impacts in the event of a collision. Consequently, a separate heat exchanger is either unnecessary or is reduced in capacity from what would otherwise be necessary where the compressor is displaced from the storage tank. Similarly, the need for primary armor for the compressor and its connections to the tank is reduced in proportion to the degree it is shielded by the tank. When fitted to a vehicle, both in original equipment factory installations and in retrofit applications, the unitized nature of the compressor and storage tank simplifies mounting procedures and eliminates the potential for improper assembly at this point.

BRIEF DESCRIPTION OF THE DRAWINGS

FIG. 2 is a schematic view of a first embodiment of the invention, illustrating a pressurized gas storage tank and an associated gas compressor mounted on the tank;

FIG. 3 is a schematic view of another embodiment of the invention, wherein a compressor and associated drive motor are mounted within a pressurized gas storage tank;

FIG. 4 is a schematic view of a further embodiment of the invention, wherein a compressor is mounted within a pressurized gas storage tank and an associated drive motor is situated externally of the tank; and FIG. 5 is a schematic view of still another embodiment of the invention similar to that of FIG. 4, in which the drive motor is coupled to the compressor when operating and at other times is uncoupled from a compressor/tank unit.

DESCRIPTION OF THE PREFERRED EMBODIMENT

Figure 1:
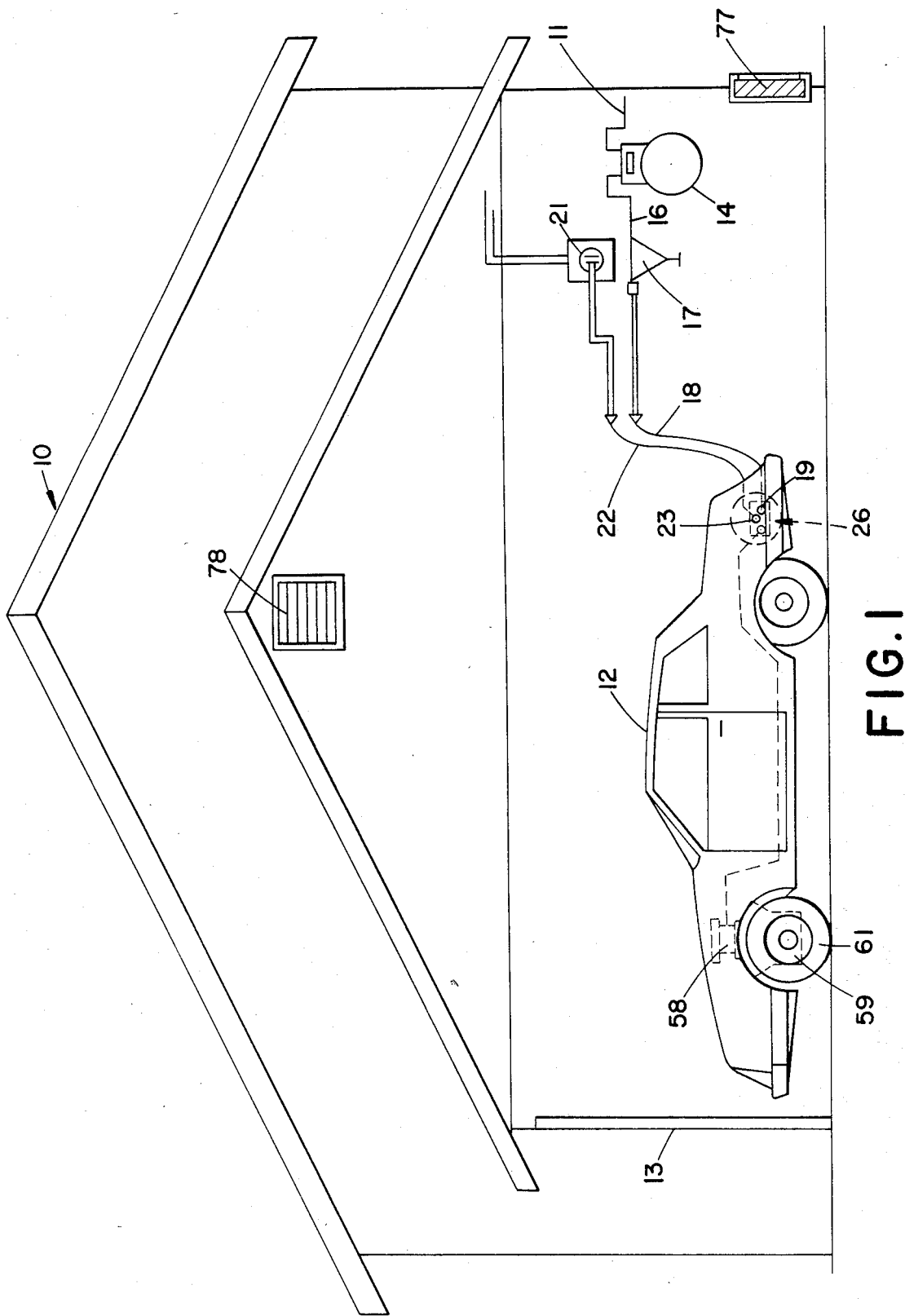
FIG. 1 is a schematic view of a residential installation of a gaseous fuel filling system for a vehicle.

Referring now to the drawings, and in particular to FIG. 1, there is shown a single-family home 10 representing a typical dwelling or other building structure such as a commercial building which is served with a gaseous fuel utility line 11. Customarily, the gaseous fuel supplied by the line 11 is natural gas or methane. As discussed below, the gaseous fuel is utilized as a fuel for a vehicle 12 parked at the site of the structure 10. In the illustrated case, the vehicle 12, typically an automobile or the like, is parked indoors in a garage 13 attached to the main structure 10. It will be understood that the invention is practical for installations outdoors as well.

The gaseous fuel line 11 in the garage 13 may be a branch of a primary line (not shown) serving the remainder of the structure 10. The line 11 is connected to a meter 14 that registers gas consumption. From the meter 14, gaseous fuel is conducted by a line 16 to a regulator 17, and thence, by a flexible hose or line 18, to a coupling 19 (FIGS. 2-5). In accordance with the invention, the regulator 17 is of the type known in the art as a zero regulator, which passes gaseous fuel only when there is a vacuum, in the order of, for example, 0.05 to 0.2 inch of water below atmospheric pressure, existing downstream in the flexible line 18 connected to it. A vacuum will exist in the line 18 when a compressor, described later, is operating to compress the gaseous fuel. The vacuum is created on the suction side of the compressor to which the flexible line 18 is ultimately coupled. The regulator 17 is thus condition-responsive to operation of the compressor via transmission of the generated vacuum signal in the line 18. Faults in the operation of the compressor, improper or non-existent hook-up of the coupling 19, and similar disorders that defeat the existence of a vacuum in the line 18 are thus automatically guarded against by the regulator 17 which, under any of these conditions, interrupts gas flow. Ordinarily, gas is supplied from the meter 14 to the regulator 17 at relatively low pressure, such as a few inches of water.

A source of electrical energy is diagrammatically represented by a power outlet 21. Electrical power at the outlet 21 may, for example, be conventional residential power rated at 110 volts, single-phase, with a rating of 10 amps. Connected to the outlet 21 is a flexible power cord 22 which, for convenience, can be secured along the flexible hose 18 in a suitable manner and is provided with a connector 23 adjacent the hose coupling 19.

A fuel compressor and storage tank unit 26 (FIG. 2) is mounted within the body of the vehicle 12 by suitable straps, clamps, or other conventional securing means. The straps 27 conform to federal Department of Transportation standards. The unit 26 includes a compressed gas storage tank 28 of generally conventional construction and conforming to applicable Department of Transportation and ASME standards.

Attached to one end of the tank 28 is a cylindrical shield 29 having an integral, radially extending end wall 31. The shield 29 serves as armor for a compressor 32 and associated electric motor 33 encased within it. The shield 29 is formed of a material such as alloy steel of sufficient strength to protect the compressor 32, motor 33, and related internal gas circuits in the event of a collision. The shield 29 is secured to the tank, for instance, by a circumferential weld 34 near the end of the cylindrical portion of the tank 28. The interior of the shield 29 communicates freely with the atmosphere through means of inlet vents 36 and an outlet vent 37.

Within the shield 29 an inlet 41 of the compressor is connected through a line 42 to the coupling 19. In series in the line 42 is an oxygen sensor 43. The oxygen sensor 43 is, for example, of the general type used in control of commercial combustion processes to monitor the percentage of $O_2$ in stack gases or of the general type more recently used in automotive applications to monitor the oxygen content of exhaust gases of internal combustion engines. The oxygen sensor 43, through a suitable switching circuit integrated with it, is capable of de-energizing the motor 33 through a circuit represented by electrical control lines 44, in the event that the percentage of oxygen gas existing in the line 42, after a suitable delay for start-up of the compressor and purging of small amounts of air which could enter such line during coupling and uncoupling of the supply hose 18, exceeds a predetermined safe value. While the oxygen sensor 43 is illustrated in the line 42, it is to be understood that, alternatively, it can be disposed within the tank 28. In this instance, a time delay circuit to ignore short surges of high oxygen content in the line 42 at start-up would be unnecessary. By way of example, the sensor 43 can be used to initiate shut-off of the compressor when the $O_2$ content exceeds 5%.

In the application of the invention to a vehicle such as a passenger car, where the car is out of service on a daily or other regular basis, the compressor 32 is sized at approximately 1 cfm at standard conditions. The motor 33 is rated, under these circumstances, at approximately one-half horsepower. The coupling 19 and a receptacle 47 for it mounted on the end wall 31 can each be of the type known in the art having an integrated check valve operable upon separation to prevent leakage. Such coupling 19 and receptacle 47 can, of course, conform to industry standards of size, shape, capacity, etc.

A high-pressure line 51 communicates with the interior of the tank 28. Flow of gas through the line 51 from the tank 28 is controlled by a regulator 52. The regulator 52, of known construction, is energized by the ignition key of the vehicle 12 through the vehicle's low voltage ignition circuit by an electrical line 53. The regulator 52 can be of the type which reduces pressure so that a line 54 connected to its outlet feeds a constant pressure-regulated supply of gaseous fuel independent of variations in the pressure of gas contained in the tank 28 during periods that it is being depleted. The line 54 is connected through a suitable bulkhead coupling 56 to a line 57 running along the body of the vehicle 12 to connect the tank 28 to the spark ignition internal combustion engine 58. Gaseous fuel is metered upon demand from the line 57 to the engine 58 in a known manner. The engine 58 is connected conventionally through a suitable drive train, diagrammatically represented at 59, to drive associated wheels 61 of the vehicle.

The motor 33 is of the canned rotor type such that its rotor, designated 66, is within a non-magnetic, can-shaped housing 67 having its interior in communication with the interior working chamber of the compressor 32. Although shown as a single-stage machine, the compressor 32 can be of the multistage, reciprocating piston type. As indicated, the compressor 32 is mounted on one of the bell ends of the tank 28 by, for example, threading it into female threads on a boss 72 in the center of the bell end wall of the tank. The motor 33, in turn, is mounted on the compressor 32 by suitable screws or other conventional fastening means. Where desired, a support from the end wall 31 of the shield 29 or other area of the shield may be provided to carry a portion of the weight of the motor 33 and compressor 32 so as to avoid cantilever effects of the weight of these bodies and adverse stresses on the portions of the compressor engaged with the tank 28. In any event, it is seen that at least a portion of the weight of the compressor 32 is borne directly by the tank 28 by virtue of its direct engagement therewith. The compressor inlet 41 communicates with the supply line 42 through the interior of the rotor can 67. An outlet 73 of the compressor 32 communicates directly with the interior of the tank 28.

In practicing the invention in its described application to a passenger car 12, the car is parked at the residence 10, for example overnight, while the tank 28 is recharged with gaseous fuel to replace any fuel previously used in the preceding day or days. A person, ordinarily an occupant of the household 10, parks the vehicle in the garage and connects the coupling 19 and connector 23 to their respective receptacles associated with the compressor/storage tank unit 26. The garage 13 is provided with low and high point ventilators 77,78 for safety purposes. A pressure sensing switch or similar device of known construction (not shown) integrated with the compressor 32 and monitoring the internal pressure of the tank 28 through the outlet 73 of the compressor 32 automatically controls operation of the electric motor 33. When the power cord 22 is connected by the connector 23, electrical energy is available to operate the compressor motor 33. At the same time, with the start-up of the compressor 32 and the creation of a vacuum in the flexible hose 18, the regulator 17 supplies gaseous fuel to the compressor 32. The compressor 32, driven by the motor 33, continues to operate until the interior of the tank 28 is recharged to its design pressure which, for example, is in the order of 2400 psig. For purposes of simplicity, the connectors 19,23 are shown to be connected to the end wall 31 of the shield 29, but it will be understood that the connecting points can be remote from such end wall and can be mounted on the body of the vehicle 12 at any convenient point and be connected to the compressor and motor by appropriate lines. When the predetermined pressure has been reached within the tank 28, the pressure switch disconnects the electric motor 33 from the power cord 22, causing the compressor 32 to stop. The flexible refilling hose 18 and power cord 22 may remain connected until the vehicle is to be put into service, at which time the coupling 19 and connector 23 are uncoupled. Typically, a fully charged tank 28 holds the equivalent of 3 to 4 gallons of gasoline and yields a corresponding range for the vehicle, depending on its mileage. Where desired for extended range, two or more tanks can be provided on the vehicle with suitable interconnections, known in the art. In such a case, the compressor need only be associated with one tank, and the other tanks can be filled from such one tank. In those circumstances where it is not convenient to recharge a tank overnight but, rather, to recharge it in a short time and/or away from the home base 10, a high pressure line can be connected to the receptacle 19 in place of the coupling. A high pressure source, such as is available at a commercial filling station, can be conducted directly to the tank through a bypass circuit 71 without operation of the compressor 32. The bypass circuit 71 leads from the line 42 directly to the interior of the tank 28 without passing through the working chambers, including a compression chamber 70 of the compressor 32. Check valves 74, 75, and 76 permit alternative flow through the working chambers of the compressor 32 and/or bypass circuit 71 when pressure in these areas exceeds the pressure in the tank 28, but prevent back flow out of the tank.

FIGS. 3 through 5 illustrate various other embodiments of the invention. In the following description of the embodiments of these figures, elements identical or substantially identical to those described in connection with FIGS. 1 and 2 are designated by the same numerals, and modified but corresponding elements are designated by numerals with letter suffixes. In general, the embodiments of FIGS. 3 through 5 are variations in the construction of a storage tank/compressor unit in which the compressor is supported on a tank either within its envelope or immediately adjacent to it.

In the embodiment of FIG. 3, the compressor 32a and motor 33a are disposed within the compressed natural gas storage tank 28a. The motor 33a is bolted or otherwise secured to a tank header 40a and the compressor 32a, in turn, is bolted or otherwise secured to the motor 33a. Where desired, one or more radial supports 81 from the compressor to the inner wall of the tank 28 are provided to augment the support of the compressor 32a and motor 33a in the tank 28a. In the embodiment of FIG. 3, where both the compressor 32a and motor 33a are contained within the tank 28a, the number of external lines and connections is greatly reduced and those elements within the tank are inherently shielded by it.

In FIG. 4, a compressor 32b is disposed within a pressure storage tank 28b and is welded or otherwise secured to a tank header 40b. A motor 33b is disposed on the exterior of the tank and is bolted or otherwise secured to the tank header 40b. A rotor 50b of the electric motor 33b is enveloped by a can 48b communicating with the interior chambers of the compressor 32b. The embodiment of FIG. 4 has the advantage of inherent shielding of the compressor and its gas conduits by the tank 28b. At the same time, the windings of the stator of the induction motor 33b are external of the tank and are therefore accessible for repair or replacement without access to the interior of the tank 28b. It should be understood that the various Figures are somewhat diagrammatic and are intended to illustrate general principles. For this reason, the illustrated sizes and shapes of various components are not exact. For example, differences in the illustrated size of the electrical compressor motors should not lead to the assumption that one embodiment is more efficient than another.

Referring now to FIG. 5, there is shown still another embodiment of the invention, wherein a compressor 32c is mounted externally on a tank 28c by threading it or otherwise securing it to a tank header 40c. A crankshaft 86 of the compressor 32c, extending externally of the compressor, is provided with a coupling element 87, schematically illustrated as a disc concentric with the shaft 86 and having two diametrically opposed holes 88. In this embodiment, a motor 91 can be connected to the compressor only during periods of charging the tank 28c with compressed natural gas. The motor 91 in the illustrated case is an electric motor provided with a mating coupling 92 that is positioned on the coupling 87 contemporaneously with installation of a coupling 19c. During its period of operation, the motor 91 can be clamped to a shield end plate 31c, for example, with bayonet-type clamp elements (not shown). During periods of non-use, the motor 91 can be stored in the same manner that the removable coupling 19c and its associated flexible hose 18 are stored.

The separable drive unit 91 of the embodiment of FIG. 5 has the advantage of reducing the weight which must be carried by the vehicle 12 and can be used to operate compressors of other vehicles at different times. A modification of the embodiment of FIG. 5 is to provide the motor 91 with a stationary mounting in the garage 13 and provide a flexible drive shaft or equivalent power linkage to couple with the coupling 87. In the embodiment of FIG. 5 or its just described modification, the motor 91 can be used at other times for other purposes.

In the various embodiments of the invention illustrated in FIGS. 2 through 5, it can be seen that the unitization of the compressed natural gas storage tank and compressor is characterized by the features of direct exhaust of the compressor to the interior of the tank without lines external to the tank connecting the outlet of the compressor to the tank, mechanical shielding of the compressor, at least in part, by the tank itself, and direct thermal communication between the compressor and tank enabling the tank to function as a heat exchanger to dissipate a substantial portion, if not all, of the heat generated within the compressor. These features improve the safety of the compressor storage tank unit in the event of a mishap such as a collision while reducing the amount of armor required to do so. Similarly, either the necessity of a separate heat exchanger is avoided or its size is reduced by utilizing the compressed gas storage tank as a heat exchange element for the compressor. Heat is conveniently transferred from the compressor to the tank through the elements mounting or supporting its compressor on the tank. Heat generated during operation of the compressor principally comprises inherent electrical heating losses ($I^2R$) in the compressor motor and the heat of compression of the gas. Still further, the compressor tank storage unit in a preassembled compact package, such as that disclosed, is readily installed in a factory assembly line of the vehicle or in after-market installations in the field. The zero regulator in the refilling system affords a high degree of safety, as previously disclosed.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A vehicle, a combustion engine mounted on the vehicle, a drive train for directing power from the engine into propulsion of the vehicle, a pressure tank mounted on the vehicle for storing compressed gaseous fuel such as natural gas, means connecting the pressure tank to the combustion engine to enable the contents of the tank to be combusted as fuel by the engine, a compressor mounted on the vehicle in close proximity to the tank and having an inlet and an outlet, drive means for operating the compressor to compress gas supplied at its inlet at a relatively low pressure and to deliver it at its outlet at a relatively high pressure, the mounting and spatial relationship between the compressor and tank being arranged to permit the compressor to discharge at its outlet substantially directly into the tank in a manner such that the entire compressed gas flow path between the outlet of the compressor and the interior of the tank is shrouded by at least one of said compressor and tank components to thereby substantially eliminate the risk of high pressure gas, being delivered by the compressor to the tank, from leaking.

2. A vehicle as set forth in claim 1, wherein the compressor is mounted within the interior of the pressure tank and the drive means is mounted on the exterior of the tank.

3. A vehicle as set forth in claim 1, wherein the compressor and drive means are mounted within said tank.

4. A vehicle as set forth in claim 1, wherein the compressor, drive means, and tank elements are arranged to provide direct thermal conduction through such elements, whereby a substantial portion of the heat generated by the compression process and also the compressor during its operation is transmitted to the tank and then to the external environment of the tank.

5. A vehicle, a combustion engine mounted on the vehicle, a drive train for directing power developed by the engine into propulsion of the vehicle, a pressure tank mounted on the vehicle for storing compressed gaseous fuel such as natural gas, means connecting the pressure tank to the combustion engine to enable the contents of the tank to be combusted as fuel by the engine, a compressor mounted on the vehicle in close proximity to the tank and having an inlet and an outlet, drive means for operating the compressor to compress gas supplied at its inlet at a relatively low pressure and to deliver it at its outlet at a relatively high pressure, the mounting and spatial relationship between the compressor and tank being sufficiently direct and proximate to permit the compressor to transfer a substantial portion of heat generated in the compression process and by the compressor in its operation directly to the tank to thereby utilize the external surface of the tank as a primary heat exchanger surface with the environment of the tank.

6. A vehicle, a combustion engine mounted on the vehicle, a drive train for directing power developed by the engine into propulsion of the vehicle, a pressure tank mounted on the vehicle for storing compressed gaseous fuel, such as natural gas means connecting the pressure tank to the combustion engine to enable the contents of the tank to be combusted as fuel by the engine, a compressor mounted on the vehicle in close proximity to the tank and having an inlet and an outlet, an electric induction motor for operating the compressor to compress gas supplied at its inlet at a relatively low pressure and to deliver it at its outlet at a relatively high pressure, the mounting and spatial relationship between the compressor and tank being arranged to permit the compressor to discharge at its outlet substantially directly to the tank, said motor having a stationary field winding in a stator and an induction-driven rotor including a shaft, a non-magnetic gastight enclosure within said stator and enclosing said rotor, the interior of said enclosure being in communication with the interior of said compressor, said enclosure eliminating the need for a seal on said shaft to contain gas pressurized by said compressor.

7. A vehicle, a combustion engine mounted on the vehicle, a drive train for directing power from the engine into propulsion of the vehicle, a pressure tank mounted on the vehicle for storing compressed gaseous fuel, such as natural gas means connecting the pressure tank to the combustion engine to enable the contents of the tank to be combusted as fuel by the engine, a compressor mounted on the vehicle and having an inlet and an outlet, drive means for operating the compressor to compress gas supplied at its inlet at a relatively low pressure and to deliver it at its outlet at a relatively high pressure, the outlet being connected to the interior of the tank, coupling means for connecting a supply of gaseous fuel to the compressor inlet, and oxygen sensor means disposed in the path of fuel between the coupling means and interior of the tank and adapted to interrupt operation of said drive means when the oxygen content in the gas in said path exceeds a predetermined percentage.

8. A vehicle, a combustion engine mounted on the vehicle, a drive train for directing power from the engine into propulsion of the vehicle, a pressure tank mounted on the vehicle for storing compressed gaseous fuel, such as natural gas means connecting the pressure tank to the combustion engine to enable the contents of the tank to be combusted as fuel by the engine, coupling means for connecting a supply of gaseous fuel to the interior of the tank, oxygen sensor means disposed in the path of fuel between the coupling means and interior of the tank, and electrical conductor means connected to the oxygen sensor and adapted to conduit an electrical signal to interrupt delivery of gas to the coupling means when the oxygen content in the gas in said path exceeds a predetermined percentage.

9. A vehicle, a combustion engine mounted on the vehicle, a drive train for directing power from the engine into propulsion of the vehicle, a pressure tank mounted on the vehicle for storing compressed gaseous fuel, such as natural gas means connecting the pressure tank to the combustion engine to enable the contents of the tank to be combusted as fuel by the engine, a compressor mounted on the vehicle and having an inlet and outlet and a compression chamber therebetween, drive means for operating the compressor to compress gas supplied at its inlet at a relatively low pressure and to deliver it at its outlet at a relatively high pressure, the outlet being connected to the interior of the tank, coupling means for connection with a supply line of gas, first circuit means connecting said coupling means to said inlet and second circuit means connecting said coupling means to the interior of the tank through a path separate from said compression chamber, whereby high pressure gas supplied at said coupling means can be conducted to said tank without operation of said compressor.

10. A gaseous fuel supply system comprising a vehicle having mounted thereon a pressure tank for storage of fuel and a compressor for receiving gaseous fuel at a relatively low pressure, compressing it and delivering it at a relatively high pressure to the tank for storage, means for driving the compressor, a stationary supply of gaseous fuel at relatively low pressure, a line for temporarily connecting the stationary supply to the compressor during periods in which the tank is recharged, regulator means connected to the supply and responsive to the pressure in said line, said regulator means being operable to permit flow through said line only when a vacuum exists in said line.

11. A method of recharging a pressure storage tank on a vehicle carrying an on-board compressor, comprising the steps of temporarily connecting a stationary gaseous fuel supply to the inlet of the compressor, disposing a zero regulator in the circuit between the supply and the compressor inlet and allowing the regulator to safeguard recharging operations by permitting it to pass gas only when a vacuum developed by the compressor at its inlet exists in the circuit.

* * * * *

UNITED STATES PATENT AND TRADEMARK OFFICE
CERTIFICATE OF CORRECTION

PATENT NO. : 4,501,253

DATED : February 26, 1985

INVENTOR(S) : Joseph Gerstmann et al.

It is certified that error appears in the above-identified patent and that said Letters Patent are hereby corrected as shown below:

Column 9, line 6, "conduit" should be changed to read --conduct--.

Signed and Sealed this

Twenty-seventh Day of August 1985

[SEAL]

Attest:

DONALD J. QUIGG

*Attesting Officer*  *Acting Commissioner of Patents and Trademarks*